United States Patent [19]
Weber

[11] Patent Number: 5,585,869
[45] Date of Patent: Dec. 17, 1996

[54] HINGED SPECTACLES WITH AIR DEFLECTION SURFACES

[76] Inventor: Karl Weber, Brunnenwiesen 41A, D-7000 Stuttgart 75, Germany

[21] Appl. No.: 454,194

[22] PCT Filed: Dec. 18, 1992

[86] PCT No.: PCT/EP92/02955

§ 371 Date: Jun. 19, 1995

§ 102(e) Date: Jun. 19, 1995

[87] PCT Pub. No.: WO94/15242

PCT Pub. Date: Jul. 7, 1994

[51] Int. Cl.⁶ ............... G02C 1/00; G02C 5/02; G02C 5/00
[52] U.S. Cl. ............................................. 351/83
[58] Field of Search ................. 351/41, 44, 83, 351/86, 95, 96, 99–101, 106–110, 140, 142, 148, 150, 151, 152, 153, 158, 124, 128; 2/13, 448

[56] References Cited

U.S. PATENT DOCUMENTS

| | | | |
|---|---|---|---|
| 1,174 | 6/1839 | Thaxter | 351/44 |
| 4,964,714 | 10/1990 | Weymouth, Jr. et al. | 351/62 |
| 5,131,737 | 7/1992 | Pernicka | 351/88 |

FOREIGN PATENT DOCUMENTS

| | | |
|---|---|---|
| 0496292A1 | 7/1992 | European Pat. Off. . |
| 955584 | 1/1950 | France . |
| 733927 | 3/1943 | Germany . |
| 8713756 U | 1/1988 | Germany . |
| 437634 | 11/1967 | Switzerland . |

*Primary Examiner*—Huy Mai
*Attorney, Agent, or Firm*—Jones, Tullar & Cooper, P.C.

[57] ABSTRACT

Spectacles comprising a reslient frame and lenses with cutouts along their periphery. The frame has two frame sections. Each frame section has two frame parts defining an upper frame part and a lower frame part. The upper frame part and the lower frame part are hinged together so that they can pivot relative to each other. At least one of the frame parts in each frame section has an opening to receive a lens. The lens is inserted in a space defined by the associated upper frame part and an additional frame section which extends parallel to the associated upper frame part. The additional frame section has two short bent ends received within a respective lens cutout. These short ends are joined to the associated upper frame part. Each frame part can be displaced relative to its corresponding other frame part to widen the opening defined by the both frame parts for receiving a lens.

10 Claims, 6 Drawing Sheets

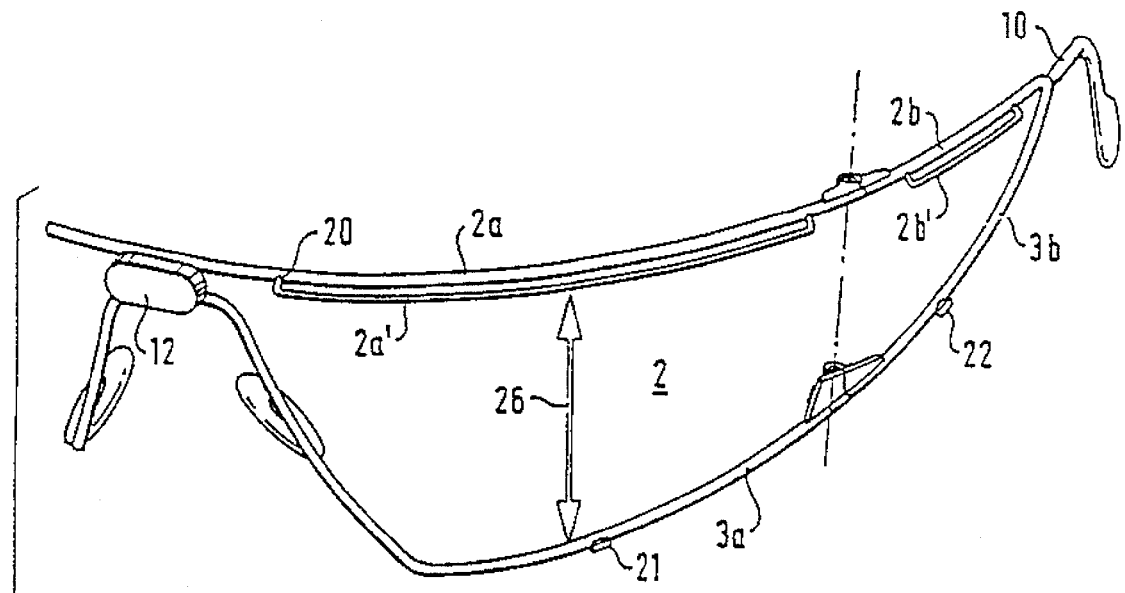
FIG. 3
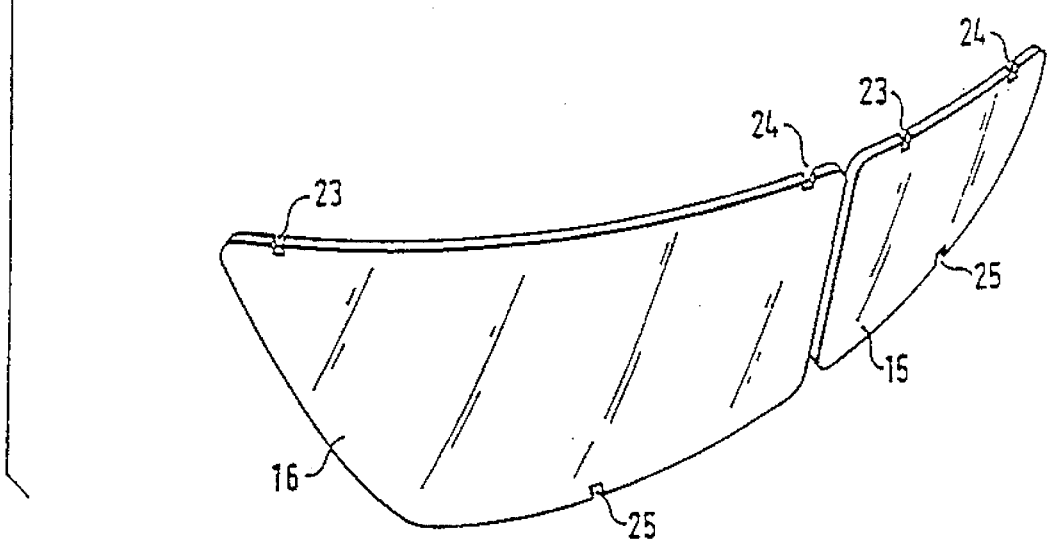
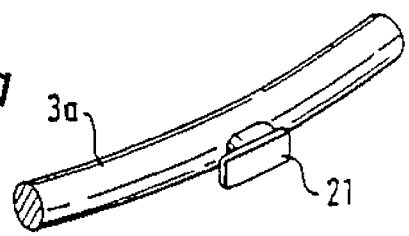
FIG. 3a

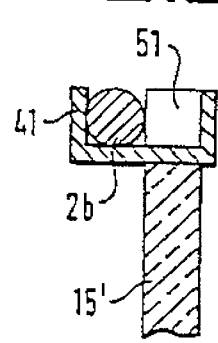
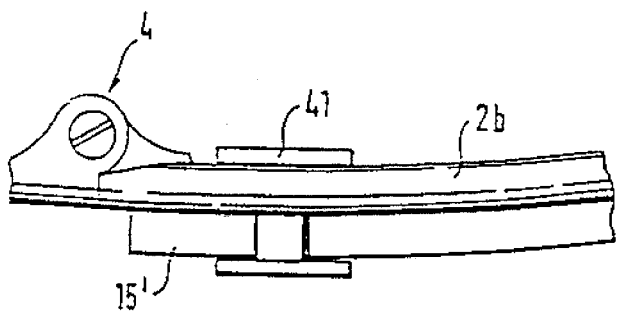
FIG. 9  FIG. 10
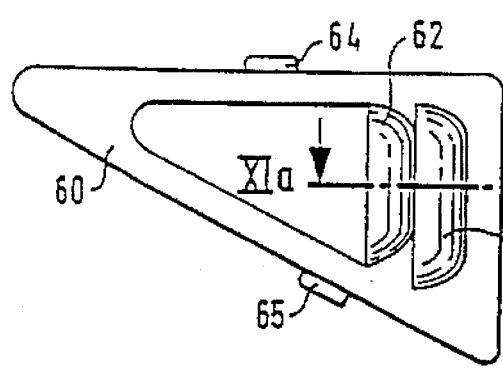
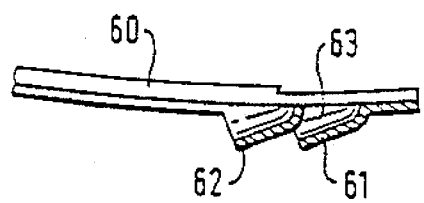
FIG. 11  FIG. 11a
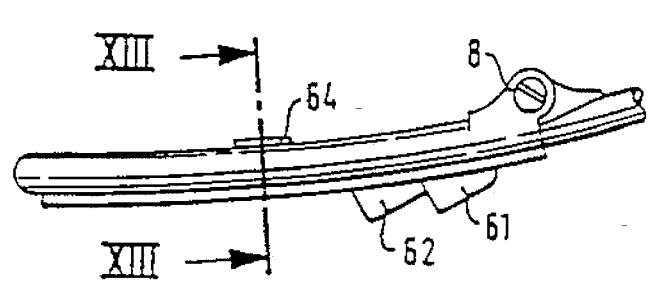
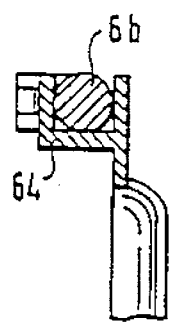
FIG. 12  FIG. 13

5,585,869

HINGED SPECTACLES WITH AIR DEFLECTION SURFACES

BACKGROUND OF THE INVENTION

The present invention relates to spectacles, wherein both lenses are respectively placed in openings of a frame having an upper and a lower frame part and which is furthermore provided with hinges for bending the bows disposed on the frame parts.

SUMMARY OF THE INVENTION

It is an object of the present invention to design spectacles of this type in such a way that they have advantageous flow properties, i.e. that an airflow striking them (for example when riding in a convertible, or in sports) is deflected in the most advantageous manner.

This object is attained in accordance with the present invention in that the openings are embodied with large surfaces and are oblong, and that the respectively upper frame part as well as the lower frame part can be resiliently widened with respect to each other and are constituted by respectively two frame sections which can be bent toward each other by means of a hinge, wherein the hinges provided at the upper frame part or the lower frame part can each be rotated around the same axis of rotation, so that each opening has two flat parts which can be bent against each other, of which at least the center one can be covered by a lens each, and that the bows are disposed on the outer bendable frame sections.

Altogether, the spectacles provide—in the bent-open state—an very large cover not only for the eyes, but also for the adjoining area toward the back. This is made possible in that the openings intended for receiving the lenses are designed to be elongated and that the break for making the bows bendable by means of the hinges already takes place on the top and bottom inside the frame parts. It is then possible to arrange two lenses in each opening which are bent toward each other when the spectacles are bent. However, it is also possible to dispose only one lens or an interference guide piece within the frame. Installation or removal of the lenses is made easier in that the frame parts which surround these oblong, large-surface, elongated openings can be resiliently widened, so that the lenses can be easily installed between frame or strip parts or hooks. The advantageous further developments relate particularly to the attachment of a further flow guide piece in the center of the spectacles between the lenses. An advantageous further development relates to a novel way of lens installation by means of a specially designed clamping insert.

An exemplary embodiment of the invention and its advantageous further developments will be described in detail below by means of the attached drawings.

BRIEF DESCRIPTION OF THE DRAWINGS

FIG. 2a, is an enlarged detail view of at IIa in FIG. 2;

FIG. 3, shows one half of the spectacles with associated lenses 15, 16 in a pulled-apart view, FIG. 3a, show details of a hook 21;

FIG. 9, is a section taken along the arrows IX—IX in FIG. 8;

FIG. 10, is a view in the direction of the arrows X—X in FIG. 9;

FIG. 11, shows a flow guide piece 60;

FIG. 11a, shows a section taken along the line XIa—XIa in FIG. 11;

FIG. 12, is a view in the direction of the arrows XII—XII in FIG. 11; and

FIG. 13, is a section taken along the line XIII—XIII in FIG. 12.

DESCRIPTION OF THE PREFERRED EMBODIMENTS

Figure 1:
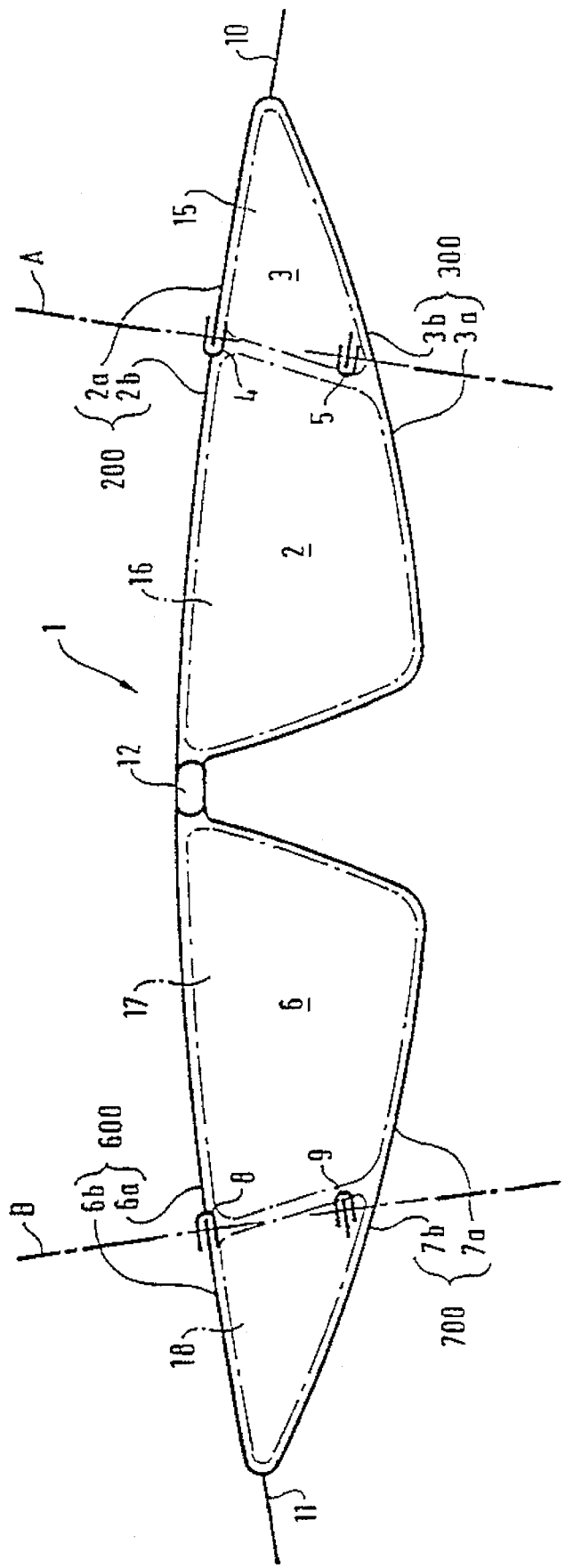
FIG. 1, is a schematic representation of the spectacles, unrolled into a plane.
Figure 2:
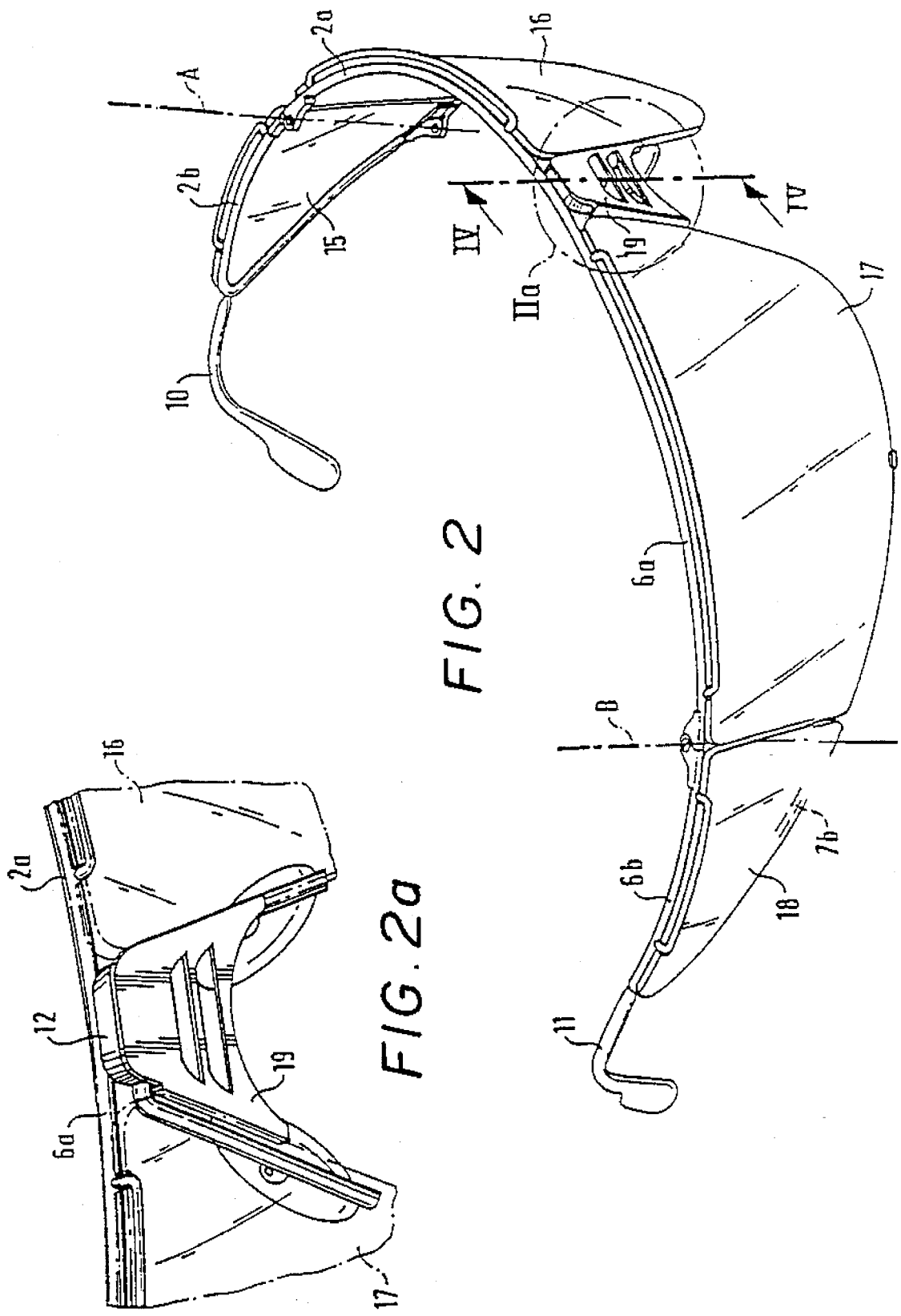
FIG. 2, is a perspective view of the spectacles.

As can best be seen from FIG. 1, the spectacles are shown unrolled or opened in a plane. The spectacles have a frame 1, which has respectively two openings 2, 3 which are wide at the center of the spectacles and are of large surface toward the ends. The opening 2 is delimited at the top by the frame sections 2a, 2b and at the bottom by the frame sections 3a and 3b. The frame sections 2a, 2b constitute the upper frame part 200, the lower frame sections 3a, 3b the lower frame part 300. The frame sections 2a, 2b or 3a, 3b are bendably connected by hinges 4, 5. The left frame part surrounding the opening 6 is also correspondingly designed. The upper frame part 600 consists of the frame sections 6a and 6b, the lower frame part 700 of the frame sections 7a and 7b, which are respectively connected by the hinges 8, 9 so they can be bent open or bent together. The central frame sections 2a and 6a, 6b and 7b, 7a and 3a, 2b and 3b are respectively embodied as a single part. The outer frame sections 2b, 3b or 6b, 7b together form a V-shaped frame part on whose apex the actual bows 10, 11 are fixedly disposed. The central frame sections 2a, 6a or 3a, 7a, which are embodied as single parts in pairs together are fixedly connected in the center in that they are soldered together with a small plate 12. The hinges 4, 5 or 8, 9 can be bent around the axes A, B passing through them. The special feature of this design of the frame 1 lies in that the hinges are provided still inside the frame parts which define the openings 2, 6, so that two surface areas which can be bent against each other result inside the oblong, large surface openings 2, 6. Thus, two lenses—indicated by dashed lines in FIG. 1—can be installed in each opening which, when the bows 10, 11 are bent against each other, are also bent around the axes A or B. The lenses are indicated in FIG. 1 by 15, 16, 17, 18. Their position has not been drawn in exactly in FIG. 1; FIG. 1 is only intended to basically associate the position of the lenses 15 to 18 with the "raw" frame. In the course of this, however—and this is important—it becomes clear that, if the lenses 15, 16 extend from both sides close to the axis A, B, a uniform surface is being created on each side of the spectacles which extends back to the ear. This then is the surface of the openings 2, 6, which is then covered in two parts, i.e. by the lenses 15, 16, for example, and whose covering parts, i.e. the lenses 15, 16, for example, can be bent or folded against each other by means of the hinges 4, 5.

This particularly large surface embodiment of the openings covered by lenses extending back into an area which otherwise is already occupied by bows is further aided by the frame 1 having a continuous, uniformly rounded shape of a semicircle in the bent open state in a top view, as can be seen in FIG. 1.

The exact embodiment of the spectacles now can be seen from FIGS. 2, 2a, 3 and 3a. As can be seen in FIG. 3 (upper half, which shows the frame without lenses), there is a further frame section 2a' parallel with respect to the frame section 2a. There is also a frame section 2b' parallel with respect to the frame section 2b. The distance of both is equal to the thickness of the lenses 15, 16. The frame sections 2a' and 2b' are slightly shorter than the frame sections 2a and 2b and are soldered to them by their short bent ends 20. Small hooks 21, 22, whose shape can be seen in FIG. 3a, are located at the frame sections 3a or 3b on the underside of the opening 2. The lenses 15, 16 have respectively two cutouts 23, 24 at the top, and at the bottom respectively one cutout 25. If now the upper and lower frame parts which delimit the opening 2 at the top and bottom are slightly widened resiliently with respect to each other, as indicated by the two-headed arrow 26, it is possible to insert the lenses 15, 16 in such a way that the hooks 21, 22 engage respectively one cutout 25 on the underside of the frame sections 3a, 3b, and the cutouts 23, 24 on the lenses 15, 16 receive the bent ends 20 of the frame sections 2a' or 2b'. The hook 21 is embodied to be slightly wider than a cutout, so that it supports the lenses from below and also slightly overlaps the edges of the cutouts 25 from the outside on both sides. The resilient widening capability of the frame parts or frame sections for installing the lenses is favored by the very long embodiment of the frame parts 200 etc. which, in turn, is made possible by providing the hinges within the frame parts which define the openings.

Figure 4:
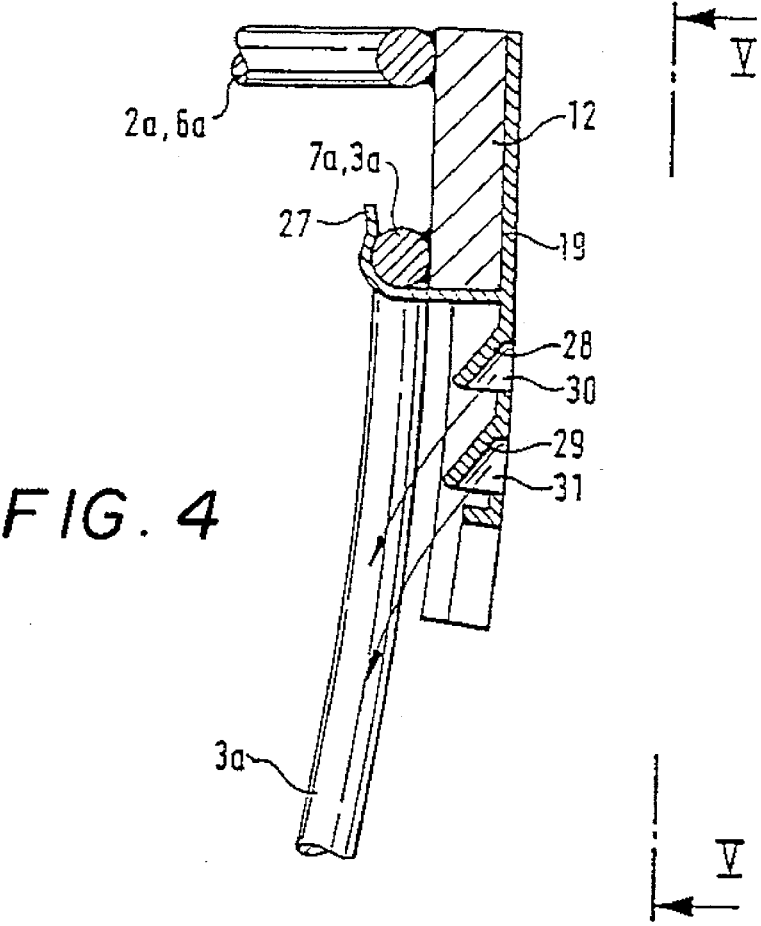
FIG. 4, is a section taking along the line IV—IV in FIG. 2.
Figure 5:
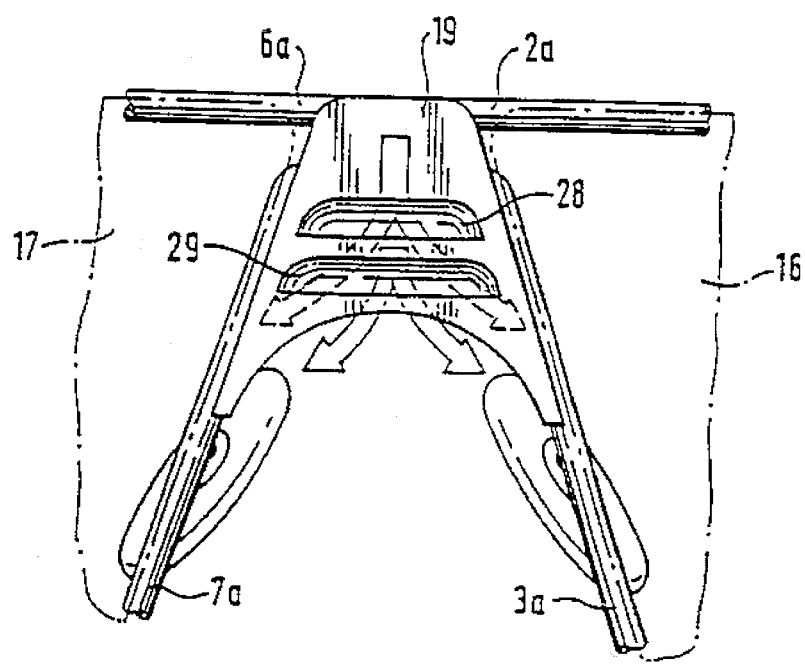
FIG. 5, is a view in the direction of the arrows V—V in FIG. 4.

FIGS. 4 and 5 show the embodiment of a flow guide piece 19 which has been pushed on and held on to the plate small 12 by means of a spring clip 27 attached to the flow guide piece 19 and clampingly overlaps the small plate 12 as well as the frame sections 3a (or 7a) connected therewith. The flow guide piece 19 is provided with two lamellas 28, 29, which are placed obliquely toward the inside, i.e. toward the nose, so that it has two slit-like openings 30, 31 extending obliquely downward and inward. The flat flow guide piece 19 laterally adjoins the spectacle lenses 16 and 17, as can be seen in FIG. 5, and in this way shields the space above the nose and the two lenses in the upper quarter or third against impinging airflow. It deflects the airflow downward along the nose, so that the impinging airflow is not laterally deflected over the eyes. This is of particular advantage when the spectacles are not only worn as sunglasses, but also as protection against the air flow, for example when riding in a convertible or in sports. The flow direction is indicated by the broad arrows.

Figure 6:
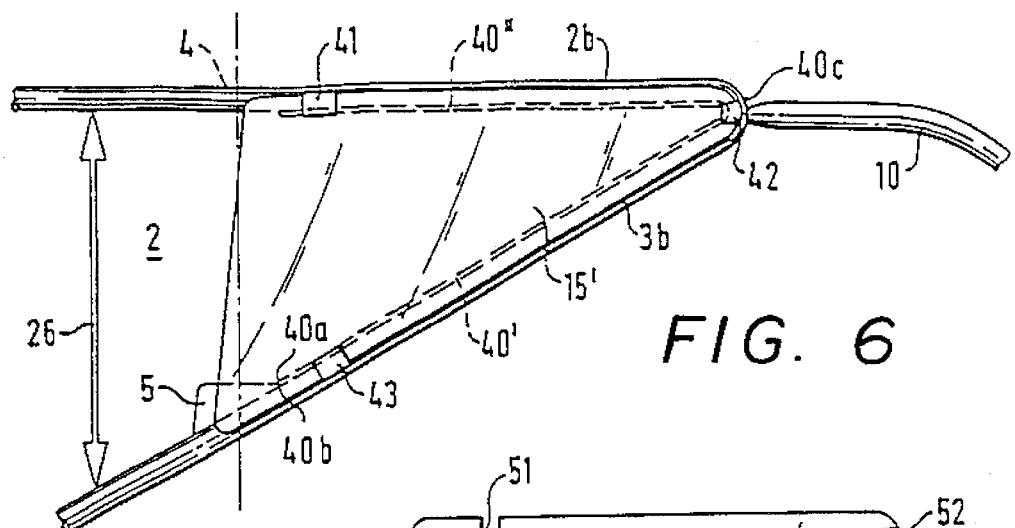
FIG. 6, is an outer, rear partial area of the opening 2 of the spectacles in accordance with FIGS. 1 and 2.
Figure 6A:
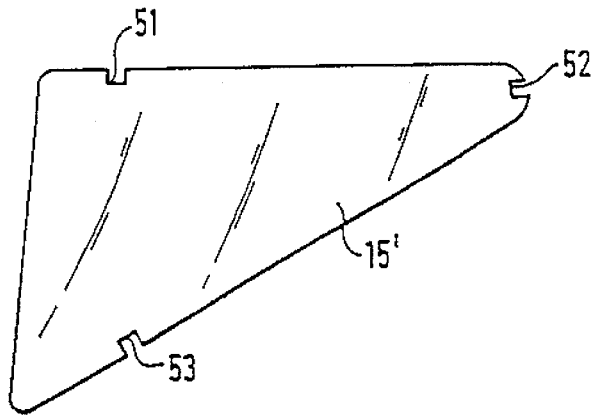
FIG. 6a, is a detail view a lens, which is installed in FIG. 6.
Figure 7:
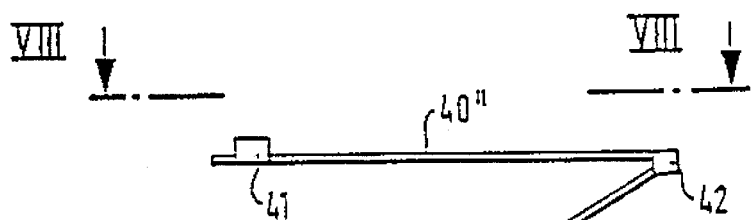
FIG. 7, shows a resilient clamping insert.
Figure 8:
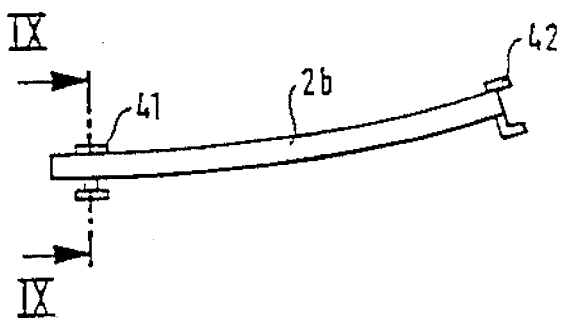
FIG. 8, is a view in the direction of the arrows VIII—VIII in FIG. 7.

FIGS. 6 to 10 show another possibility for fastening the lenses in such a frame, namely for example a lens 15' which is installed in place of the lens 15 in the rear part of the opening 2 between the frame sections 2b and 3b. In the course of this installation, a V-shaped resilient clamping insert 40, shown in FIGS. 7 and 8, is used which—as can be seen from FIGS. 6 and 7—has three small clamps 41, 42, 43, U-shaped in cross section, wherein the clear space of the two outer legs of the clamps is respectively sufficiently large so that a frame section as well as the lens 15', which has cutouts 51, 52, 53 at this place, can be received between them, as can be seen in FIGS. 9 and 10 (also see FIG. 6a). The lens 15' is mounted as follows: first the V-shaped clamping insert 40 is taken and placed into the outer part of the opening 2 between the frame sections 2a, 2b. In the process, the free end 40a (drawn in dashed lines in FIG. 6) of the clamping insert abuts against a stop 40b provided on the hinge 5. This has the result that the clamping insert 40 cannot be displaced further downward to the left at this place. Displacement upwards or to the upper right is limited in that the clamping insert rests on the inside with its apex 40c against the also V-shaped connection of the frame sections 2b, 3b. The lens 15' is then inserted; in the process first the cutout 52 is advantageously pushed into the clamp 42 and, since it is made possible by the described design of the frame, subsequently the frame sections 2b, 3b, and at the same time also the legs 40', 40" of the clamping insert 40, are resiliently widened far enough so that the lens 15' can be inserted. In the course of the resilient return movement of the frame parts 2b, 3b or of the legs 40', 40" against each other, the clamps 41, 43 move into the cutouts 51, 53 from the outside and overlap the adjoining areas of the lens 15'.

FIGS. 11 to 13 show a flow guide piece 60 which can be inserted between the frame parts 6b, 7b in place of a lens 18. It is formed by an essentially triangular frame, whose broad part is provided with two lamellas 61, 62, between which a flow opening 63 is located. The lamellas are placed obliquely toward the back and inside. If a flow from the outside impinges tangentially on them, a suction is created at the flow opening 63 which aspirates eddies created in the area of the hinges or the adjoining lens 17.

The flow guide piece 60 has been provided with two hooks 64, 65 for insertion between the frame sections 6b, 7b, which overlap the frame sections, as can be seen in FIG. 13. Insertion again is possible because the frame parts can be widened.

I claim:

1. Spectacles formed by a resilient frame and a plurality of lenses, the lenses each including a peripheral surface with at least one cutout formed therein, the frame comprising:

two frame sections, each frame section having two frame parts which together define an upper frame part and a lower frame part, each frame part defining a hinge with the hinges being coaxial such that one frame part of the two frame parts can pivot relative to the other frame part, and with at least the frame part of the other of said two frame parts defines an opening to receive a lens, and an additional frame section defining short bent ends joined to at least one of said upper frame parts, each said additional frame section extending parallel to its respective upper frame part and defining therewith a space for receiving a lens with the short bent ends being received within a lens cutout; and wherein, each frame part can be displaced relative to its corresponding other frame part to widen the opening defined by both frame parts for receiving a lens.

2. The spectacles as defined in claim 1, wherein at least one of said lower frame parts defines a hook received within a cutout of its associated lens.

3. The spectacles as defined in claim 1, wherein said frame further comprises:

a plate situated between said frame sections; and a flow guide piece mounted to said plate.

4. The spectacles as defined in claim 3, wherein said flow guide piece is provided with at least one horizontal slit-like opening defined partly by a lamella which is directed obliquely downwardly in a direction toward the interior of the spectacles.

5. The spectacles as defined in claim 3, wherein said flow guide piece covers a quarter of the area defined between said frame sections.

6. The spectacles as defined in claim 3, wherein said flow guide piece covers one-third of the area defined between said frame sections.

7. The spectacles as defined in claim 1, wherein said frame further comprises:

a resilient clamping insert for holding a lens in the opening defined by one frame part of at least one of said two frame parts of at least one of said frame sections.

8. The spectacles as defined in claim 7, wherein said frame further comprises:

a stop associated with said frame part receiving said resilient clamping insert for fixing said resilient clamping insert to said frame part.

9. The spectacles as defined in claim 1, wherein said frame further comprises:

a flow guide piece inserted within one frame part of at least one of said two frame parts of at least one of said frame sections, said flow guide piece having at least one lamella defining an opening, said at least one lamella being oriented perpendicular relative to its associated upper frame part, each lamella being directed obliquely toward the interior of the spectacles.

10. The spectacles as defined in claim 1, wherein the spectacles, when viewed in top plane view, have the shape of a semicircle.

* * * * *